Figure 6:
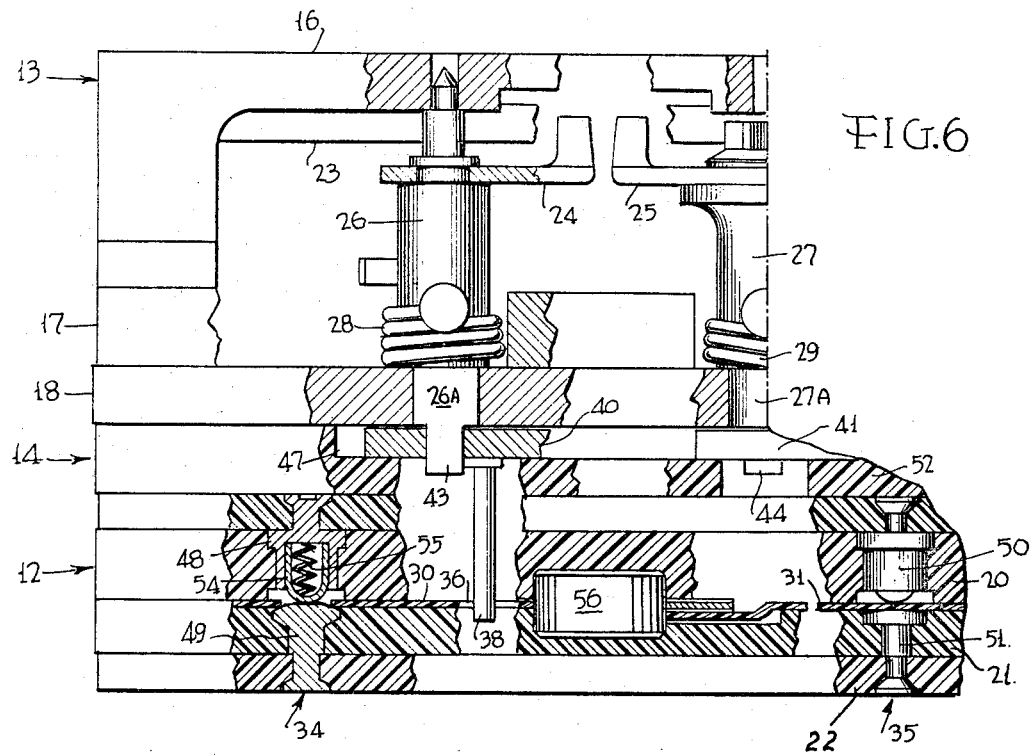

Jan. 14, 1969
J. F. BAKER ET AL
HIGH SPEED SEQUENTIAL SWITCH
Filed Sept. 27, 1966
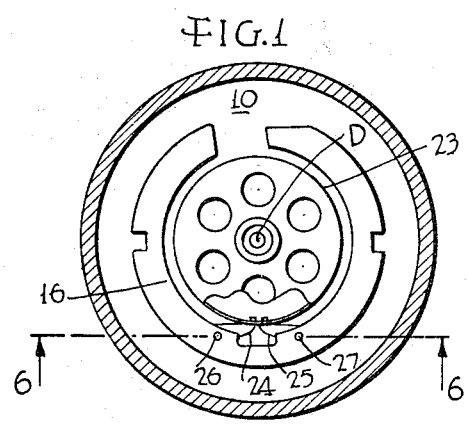
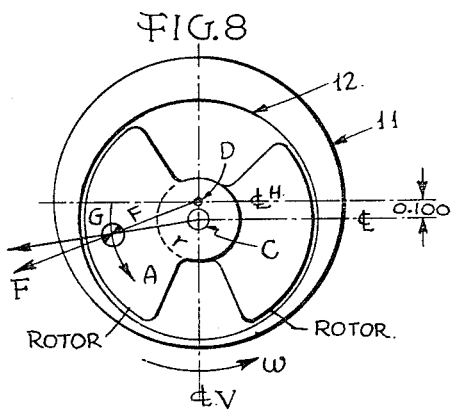
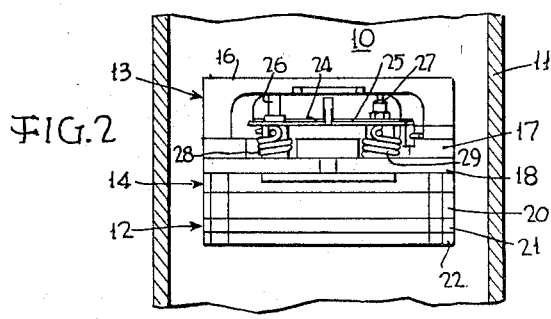
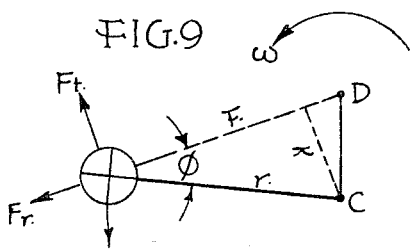
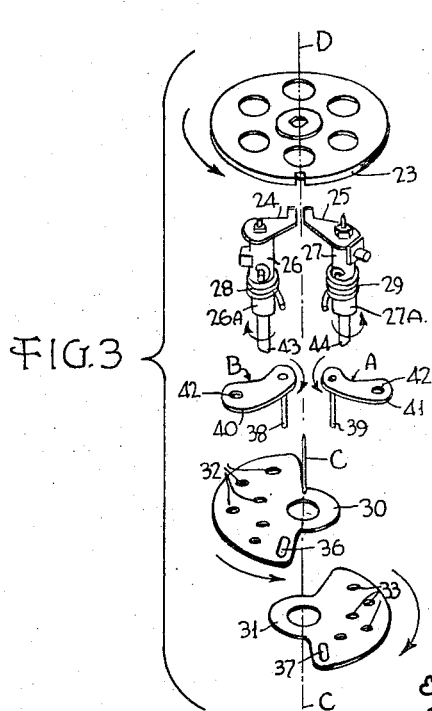
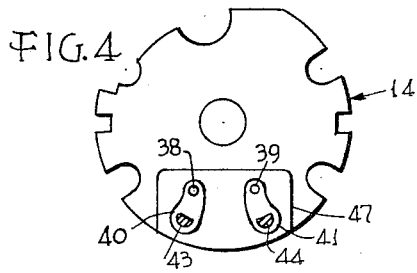
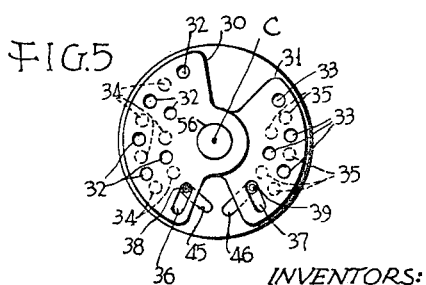
INVENTORS:
John F. Baker
Harry G. Rodrigo
Joseph A. Ryan
ATTORNEYS INVENTORS:
John F. Baker
Harry G. Rodrigo
Joseph A. Ryan
ATTORNEYS

United States Patent Office 3,422,237
Patented Jan. 14, 1969

3,422,237
HIGH SPEED SEQUENTIAL SWITCH
John F. Baker, Philadelphia, Pa., Harry G. Rodrigo,
Medford, N.J., and Joseph A. Ryan, Upper Darby,
Pa., assignors to the United States of America as
represented by the Secretary of the Army
Filed Sept. 27, 1966, Ser. No. 583,135
U.S. Cl. 200—61.45                                    6 Claims
Int. Cl. H01h 35/02

This invention relates to multi-contact sequential electrical circuit switching devices, and more particularly to switches of that type for use in space vehicles, rockets, artillery shells and the like which are subject to high acceleration rates and rotate in flight at high speeds.

Many problems are presented when electrical sequencing switches are applied to flight vehicles which spin rapidly while moving at high speeds along the flight axis or trajectory, such as artillery shells, for example. Thus it can be seen that such devices must function properly while subject to high spin speeds, wide temperature changes (−40° F. to +180° F.), vibration due to transportation and handling shock due to launching or firing, and under possible dampness or moisture conditions. During flight, loads or forces applied to such devices may reach magnitudes which could be detrimental to proper operation thereof. These loads or forces vary with the square of the speed of rotation.

It is, therefore, an object of this invention to provide an improved electrical sequential switch which may be mechanically operated for effective and dependable circuit control while subject to angular velocity or spin with high degrees of force.

It is also an object of this invention to provide a high-speed rotary sequential switch that functions in response to applied external forces in a flight vehicle subject to relatively high spin speeds and acceleration.

The high-speed rotary switch of the present invention may be assumed to operate within angular acceleration of at least $20.7 \times 10^4$ radians per second, an angular velocity of at least $12 \times 10^3$ r.p.m. and an axial acceleration of at least $12 \times 10^3$ g's.

It is, therefore, a further object of this invention to meet such operating conditions and provide in combination with a timing sequence mechanism having at least two different time-controlled output functions, an electrical sequential switch of the rotating type with improved high-speed operating characteristics and reliability which are compatible with the output functions of the timing sequence mechanism and is provided with simple and effective coupling means therewith.

In accordance with the invention and one embodiment thereof, the sequential switch contains two rotors which are released at some set time after the space vehicle, by which it is carried, has been launched into flight. Sequencing time for the release is generated by the timing movement of the unit.

The rotors of conventional switches of this type are composed of moulded plastic at least three-sixteenths of an inch thick. These thick heavy rotors are actuated by the release of the potential energy in a torsion spring. Because of the mass of the rotors, large amounts of energy are required to actuate them.

While reducing the mass and number of moving parts to a minimum, contrary to conventional design, the new sequencing switch, also utilizes as much of the forces, due to spin, as possible to operate it and very little force from springs or any other sources of potential energy. This switch reduces the mass of the rotor by eliminating moving contact points and reduces the contact resistance by reducing the number of contacts for each circuit. Furthermore all contacts are caused to remain stationary and only the insulation or insulating element moves as a relatively low mass. This necessitates that the contacts on one surface be flexible and penetrate fixed openings in the insulating element to close with the other contacts. The contact arrangement is governed by the timing element and the number of circuits to be controlled.

Any suitable fuze or timing unit or movement may be used which can be set to function or operate at two different times. The output or functioning times may here be considered as displaced one from the other by a few seconds, such as three seconds, for example. Two intermediate actuating links are used to couple the switch to the fuze movement. In the timing unit selected, two firing arm assemblies are pivoted close together, the firing arms are relatively short and an intermediate spacer plate is placed between the movement and the switch. The placing of the extra plate between the switch and timing unit or movement prevents the links from operating adjacent to printed circuit elements therein. Thus any timing unit of this type may be adapted to function with a sequencing switch constructed in accordance with the invention.

In operation, the timing movement is set into motion and the switch is cocked or latched in the open position on both rotors. The timing disc rotates until the first firing arm is released. This permits the first of the firing arm shafts to rotate in one direction and move the actuating link and link pin. The latter operates in a slot of the first rotor and cams the rotor into a position where sets of floating contacts protrude through said rotor openings and make contact with a corresponding set of stationary contacts. A few seconds later, such as three seconds, the second of said firing arms operates in the opposite direction and moves a second link and pin to cam the second rotor into a similar contact position. The floating contacts wipe along the moving insulating rotors until they drop through the rotor openings thus detenting the rotors in the contact position. The switch is thus simple and effective in use and is constructed of few parts and with a minimum of moving parts.

The invention will be further understood from the following description when considered with reference to the accompanying drawings, and scope is pointed out in the appended claims. In the drawings, FIGS. 1 and 2 are cross-sectional top and side views, respectively, of a high-speed sequential switch in accordane with the invention, and shown with relation to its mounting in a space vehicle, FIG. 3 is an exploded view, in perspective, of the main elements of the high speed sequential switch shown in FIGS. 1 and 2, indicating their relative operational positions in the switch, FIGS. 4 and 5 are top views of portions of the sequential switch, per se, showing their operative relationship in accordance with the invention.

Figure 7:
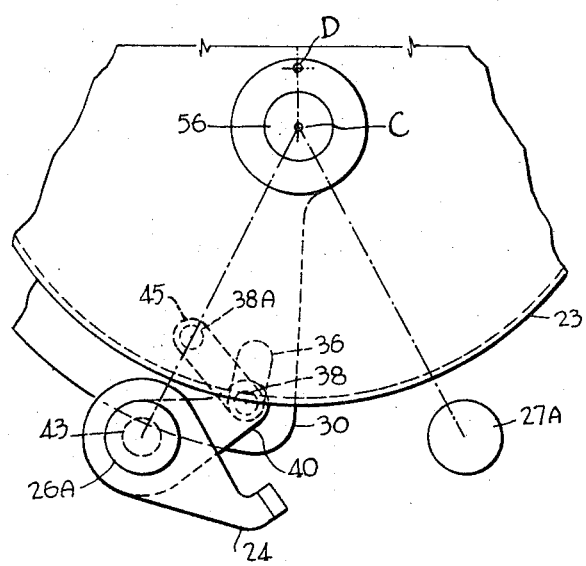

FIG. 6 is a fragmentary sectional view, in elevation, of the assembled high-speed sequential switch of FIGS. 1 and 2 taken on the section lines 6—6 of FIG. 1, FIG. 7 is a fragmentary top view of a portion of the high-speed sequential switch of the preceding figures showing an operational detail in accordance with the invention, and FIGS. 8 and 9 are schematic mechanical diagrams illustrating a principle of operation of the high-speed sequential switch of the preceding figures in accordance with the invention.

Referring to the drawings wherein like parts throughout the various figures are designated by like reference characters, and referring particularly to FIGS. 1 and 2, a high speed rotary sequential switch 10 is provided within a space vehicle or carrier 11, and comprises two separable coaxial units 12 and 13 joined with a spacer plate 14 therebetween. The common longitudinal axis of the unit 10 for both of the elements 12 and 13 is indicated at D in FIG. 1 and will be referred to hereinafter. The timing element comprises an upper frame 16, and intermediate and bottom plates 17 and 18 respectively. The switch element per se comprises a top plate 20, a bottom plate 21, and a terminal plate 22, in a stacked relation, as indicated in FIG. 2 for example.

A timing element 13 comprises a rotary spring driven timing disc 23 and two firing arms 24 and 25 each individually mounted on firing arm shafts 26 and 27 respectively and biased to rotate, when released by the timing disc 23 outwardly toward each other by suitable wrapped biasing springs 28 and 29. The axis of the shaft 26 and 27 are in parallel relation to each other and to the axis D of the timing unit and switch.

Refering now to FIGS. 3 to 7 inc., the operational relation of the various internal elements of the unit 10 are shown more clearly in detail as an aid to further understanding of the invention. The switch is of the multi-contact sequential type wherein one set of contacts is connected sequentially with respect to a second set of contacts. In this improved switch the sets of contacts are caused to remain stationary while a relatively low-mass switching element is provided for each set of contacts. In the improved switch of the present example, the movable switching elements are thin plates of insulating material or rotors 30 and 31, designated respectively as the large rotor and the small rotor.

Due to the circular shape or figuration of the sequential switch and timing mechanism, that is, the unit 10, the rotors are semicircular in shape with enlarged hub sections which fit over a guide shaft 46 to rotate about a center designated by the letter C. This center is offset from the center D of the unit 10 by a relatively small amount just sufficient offset the center of the rotors from the center of spin or rotation of the vehicle. This will be explained further with reference to FIGS. 8 and 9. The switch elements or rotors 30 and 31 are provided with a plurality of openings spaced around the area thereof as indicated at 32 and 33 respectively for the rotors 30 and 31. These are positioned so that upon rotation through a short angular distance they will uncover the sets of contacts and permit them to unite through the openings as indicated in FIG. 6 for example. These sets of contacts are designated as 34 and 35 for the respective large and small rotors in FIG. 6 and as seen in dotted outline in FIG. 5.

Each rotor is provided with an elongated radially extending slot near one end and near the periphery of each one, as indicated at 36 and 37 respectively for rotors 30 and 31. The slots are engaged by link pins 38 and 39, respectively, carried on the ends of rotating links 40 and 41 having openings 42 thereon by which they are connected to the lower tip ends 43 and 44 of respective firing arms shafts 26 and 27. The links 40 and 41 extend radially inwardly toward each other and rotate upon release of the firearms 24 and 25 in the direction of the arrows to move the rotors 30 and 31 in slots 36 and 37 along dotted slots 45 and 46 respectively as indicated in FIG. 5.

As indicated in FIG. 4, the arms 40 and 41 move in a wide recess or radial slot 47 in the spacer plate 14 with sufficient space or clearance to turn toward each other upon release and to be moved to the cocked or latched positions as shown in full lines in FIG. 4. The operation of the firing arms and link drive for the rotor elements is more clearly indicated in the enlarged views of FIGS. 6 and 7. It will be noted in FIG. 6 that the rotor ends of the firing arms shafts 26 and 27 are shouldered to provide bearing portions 26A and 27A in the bottom plate 18 of the timing unit 13, and the lower tip ends 43 and 44 are thus provided with a shoulder against which the links 40 and 41 may seat. As indicated in FIGS. 3 and 4 particularly, these tip ends are flattened in order that the shafts may drive the links 40 and 41 without other fastening means therefor.

Also as shown in FIG. 6, the sets of contacts 34 and 35, for the respective rotors 30 and 31, are fixed in the insulating plates 20 and 21 and extend into the terminal plate 22 for external connection therewith. Each of the contact sets 34 comprise an upper fixed contact 48 and a lower fixed contact 49. Likewise, the sets of contacts 35 for the small rotor 31 are provided by an upper contact 50 and a lower contact 51, are fixed and insulated in the plates 20 and 21 together with an upper terminal plate 52 in the switch section 13. As shown for the one terminal 34 in FIG. 6, all of the upper terminals are provided with movable cup-shaped contact elements 54 mounted to act as plunger elements within the hollow interior of the upper contact 48 and likewise the contacts 50 actuated by an internal compression spring 55 to move through the openings 32 and 33 in the respective rotors when moved to a position to register therewith which is "ON" for the switch.

The driving or operating pins 38 and 39 for the links 40 and 41 are sufficiently long to extend well through the movable elements 30 and 31 to always engage therewith and the slots in which they move, that is, the slots 36 and 37 are preferably lined with metal in order to provide a good bearing surface therefor. The ends of the slots extending through the movable elements are provided with elongated curved slots 45 and 46 in the plate 21 as indicated more clearly in FIGS. 5 and 7. Any other suitable flexible contact means may be provided for causing the switch contact portions to engage when the switch is operated by movement of the insulating members 30 and 31. However, the cupping and spring contact is simple and effective and is at present preferred. This construction also provides a detaining action at the closed positions as the plungers extend through the openings in the rotors thereby to hold the switches in the "ON" position as fully engaging the contacts below contact resistance.

This switch reduces the mass of the rotor by eliminating moving contact points and reduces the contact resistance by reducing the number of contacts for each circuit. Furthermore it will be noticed that all contacts are caused to remain stationary and only insulation or insulating elements 30 and 31 move and each provide a relatively low mass. This is because the insulating rotor elements may be composed of two thin plastic sheets of very light material and substantially in most cases approximately .01 inch thick. Thus the force necessary to operate the rotors is much less than required for switches of previous design. As will be seen hereinafter, the two thin plastic sheets or rotors with contact holes in the proper position therethrough are actuated by an external force. These rotors thus act as insulators between the contacts in the "off" position and provide openings through which the contact is made in the "on" position and with only a short angular movement as indicated in FIG. 7, for example, and in FIG. 5.

One of the contacts of each set on one surface of the movable plates or rotors must be flexible and operate to penetrate the fixed openings in the insulating element to close with the other contacts which are fixed. The contacts arrangement and number is governed by the switching requirements for the circuits used in connection with the switch and by the operation of the timing element used. In the present example the timing means is provided with two operating shafts and timing means for actuating these shafts in sequence with predetermined time delay. The timing element has two different time outputs or functioning times, displaced preferably by a few seconds as hereinabove mentioned. Thus as the timing disc rotates counterclockwise as indicated in FIG. 3, it first releases one arm 25 and then the other arm 24 in sequence. It should be understood that rotation may be in either direction, although counterclockwise was chosen in the present example.

The timing movement is set into operation by movement of the vehicle by set back upon launching or upon rotation in flight. As the movement starts operating, the timing disc rotates until the first firing arm is released, thereby permitting the firing shaft to rotate and move the actuating link and link pin. The link pin then moves the rotor by means of the slot therein and cams the rotor into a position where the sets of floating contacts project through the rotor openings and make contact with the corresponding set of stationary contacts. The arm 24, actuated by the spring 28, moves to rotate the large rotor 30 while the arm 25 actuated by the spring 29, rotates to move the small rotor 31 into the closed position for sequential switching operation for the various sets of contacts. The floating contacts wipe along the moving insulating rotors until they drop through the rotor openings, thus detaining the rotors in the contact positions.

Various operational tests at different speeds have been made with the switch structure, as shown and described, with satisfactory results. A brief outline of the test applied follows:

Two timing movements or units as shown and described with the component parts modified, were assembled to two like switches, also as shown and described, for tests. The switch and movement assemblies were substantially identical. The time set into the movements was approximately fifteen to twenty seconds and the speeds of operation were 2,000 to 10,000 r.p.m. in increments of 2,000 r.p.m. Each assembly was put through this test several times to check operation and each was formed to function perfectly at all speeds.

It was noted that as speed of rotation increased, the balance of the firing arms 24 and 25 and linkage 40 and 41 becomes critical. Thus the counterbalance weight of the firing arm shafts are critical above 8000 r.p.m. The links 40 and 41 are also modified as indicated in FIG. 3 width at points A and B, in order to insure that the center of gravity of each link acts to rotate the link and the firing arm outwardly toward the edge of the movement away from the timing disc in the directions indicated.

A switch of the type described, using a moving insulator or rotor instead of moving contacts, can be made to have position operation at high speeds with little if any extraneous forces except spin speed to operate, and any suitable mechanical time movement or unit can be adapted to operate this type switch as herein before noted.

In addition, it has been found that gold-plated aluminum or hollow metal balls may be used to advantage in place of the cups 54 and backed up with a spring for contact pressure the same as for the cups. Likewise, it has been found that the fixed housing of the switch next to the movement may be increased in thickness, while the links are decreased in thickness and shaped so that they will tend to rotate outwardly when the firing arms are released from the timing disc, as above described.

Also the actuating pins 38 and 39 on the links 40 and 41 respectively must be sufficiently long to penetrate through the rotor slots 36 and 37 to preclude any disengagement from the rotors. For the production purposes, the rotors may be stiffened by inserting thin grommets to define the actuating slots.

This switch may be analyzed as a component of a rotating body or space vehicle, with the pivot center of the switch displaced from the center of rotation of the body by a short distance or radius. All forces considered to act on the switch are due to the axial and angular acceleration, and angular velocity of the vehicle or body in motion.

Referring now to the diagrams of FIGS. 8 and 9, let the vehicle rotate about point D in the plane of the paper. Then the rotor will rotate about point C. The center of gravity C of the rotor will always tend to line up on a line through D and C, due to the line action of the centrifugal force Fr. This places a moment about C acting in the direction of the arrow head A. The torque generated about C will then be a function of the mass of the rotor, the angular velocity and the angular displacement of F from the center line V.

Assume an axial acceleration of the vehicle out of the plane of the paper. Then the rotor will be pressed into the paper. On angular acceleration of the vehicle in the direction of $\omega$, if the rotor is a free body, because of its inertia, the rotor will tend to rotate in a counter direction. This means that when the vehicle accelerates in a counterclockwise direction, the rotor 30 and the rotor 31 will accelerate relative to the vehicle 11 in a clockwise direction. Now if the coefficient of friction and the axial acceleration are sufficiently high relative to the angular acceleration, there will be no motion imparted to the rotors 30 and 31.

As rotational speed increases the rotors will apply more force in the direction of moving the rotors 30 and 31 to close the switches, that is, the various sets of contacts. The springs 28 and 29 on the firing arm shafts is to insure operation and maintain some pressure on the timing disc by the firing arms 26 and 27.

The high speed rotary sequential switch of the present invention thus functions in response to applied external forces in flight vehicles which are subject to relatively high spin speeds and acceleration. It requires a timing sequence mechanism having at least two different time-controlled output functions and an electrical sequential switch of the rotary type for operation thereby, together with simple and effective coupling means therebetween.

The present improved electrical sequential switch is readily adapted to operate in response to external forces applied thereto in flight in a space vehicle subject to axial and angular acceleration and angular velocity or spin with high degrees of force. This has been accomplished by present switch construction as shown and described.

We claim:

1. An improved electrical sequential switch and timing unit adapted to operate in a space vehicle subject to axial and angular acceleration and angular velocity to a relatively high degree, comprising two sets of fixed switch contacts, two circular rotor elements of relatively thin insulating material operating on a common axis and inserted one between each set of said contacts for holding said contacts in open circuit position, said timing unit including a pair of rotatable link elements one for each of said rotor elements having operating pins engaging said rotor elements to cause operational movement thereof and said rotor elements having contact openings positioned to permit engagement of said contact sets upon movement to an operating position by said pins, and said common operating axis for said rotor elements being offset to a slight degree from the center of spin of said vehicle and of the timing unit to establish an additional operating force to the force provided by the operating pins to move the rotors upon release into said operating position.

2. A high-speed rotary sequential switch and timing unit, having an axis of rotation, adapted to operate in a flight vehicle comprising in combination, means for providing two sets of fixed opposed contact elements adapted to resiliently engage and contact each other in pairs for effecting multiple sequential switching operations, a pair of relatively thin and lightweight circular rotor elements of insulating material having a common pivot axis and said rotor elements being adapted to move between said sets of contacts individually and having openings therein through which said contact elements may engage and be connected in an ON position of each of said rotor elements, timing means including said timing unit for holding each of said rotor elements in an OFF position and subjecting said elements to sequential timing release, and means for mounting said contact elements and rotor elements with said common pivot axis in offset position with respect to the axis of rotation of said unit and said flight vehicle, thereby to apply an operating force to said rotor elements to move into the ON position upon release by said timing means.

3. A high speed rotary sequential switch and timing unit as defined in claim 2, wherein said timing means for said rotor elements include a pair of sequentially releasable rotary control shafts in spaced substantially parallel relation to each other and to the axis of rotation of the vehicle, and where in a pair of flat operating links provide radial arms connected with said shafts in opposed relation to each other and a pair of operating pins carried by the free ends of said arms to move said elements.

4. A high speed rotary sequential switch and timing unit as defined in claim 2, wherein the timing unit includes a rotary timing disc having timing release means therein for a pair of pivotally-mounted firing arms positioned and biased to engage said disc at the free ends thereof for sequential release by said timing release means on spaced time relation and a pair of rotary link elements connected with said arms to pivotally move therewith on parallel relation, and wherein said link elements are shaped to provide a moving force on said arms in response to rotation on a predetermined spin axis and are connected at the free ends each with one of said rotor elements through link pins extending from said ends individually onto co-operating slots in said rotor elements and further wherein said rotor elements are relatively thin plastic circular plates of relatively low mass adapted to movement at high-speed and include spaced openings for effecting switching contact therethrough in the ON position and for disrupting said switching contact on the OFF position.

5. An improved electrical sequential switch adapted to operate in space vehicles in flight and subject to axial and angular acceleration and angular velocity to a high degree, comprising in combination, two sets of insulated electrical contacts mounted in fixed relation to each other a pair of relatively light low-mass switching elements of thin insulating material one interposed between each set of said contacts, said switching elements having a common axis of rotation and contact openings for permitting said sets of contacts to engage and be connected through the respective element associated therewith when moved to the ON position, and the said axis of said switching elements being offset from the axis of spin of a space vehicle in which said switch is mounted to develop a component of force tending to move said switch elements from the OFF to the ON position, timing controlled means for locking said switch elements in the OFF position, and for sequentially releasing said elements to close first one and then the other of said sets of contacts in spaced sequential timed relation.

6. An improved electrical sequential switch as defined in claim 5, wherein the switching elements and timing elements of said timing means are provided by two separate sections separated by a spacer block and mounted in co-axial relation on the spin center of the vehicle, and wherein the rotary switch elements are semicircular plates of relatively thin light-weight insulating material having relatively low mass, whereby said elements are adapted for high speed operation.

References Cited

FOREIGN PATENTS 623,483   7/1961   Canada.

ROBERT K. SCHAEFER, *Primary Examiner.*

MORRIS GINSBURG, *Assistant Examiner.*

U.S. Cl. X.R.

102—70.2